United States Patent
Sease et al.

[15] 3,683,975

[45] Aug. 15, 1972

[54] METHOD OF VIBRATORY LOADING NUCLEAR FUEL ELEMENTS

[72] Inventors: John D. Sease; Francis E. Harrington, both of Knoxville, Tenn.

[73] Assignee: The United States of America as represented by the United States Atomic Energy Commission

[22] Filed: Feb. 12, 1971

[21] Appl. No.: 115,118

[52] U.S. Cl. .................... 141/12, 29/420.5, 176/68, 176/73, 176/90, 259/1, 264/.5, 264/70, 264/71, 264/122
[51] Int. Cl. ............................ B65b 1/04, B65b 3/04
[58] Field of Search ............... 141/12, 71, 72, 73, 77; 29/420, 420.5; 176/68, 73, 90; 259/1; 264/0.5, 70, 71, 122

[56] References Cited

UNITED STATES PATENTS

| | | | |
|---|---|---|---|
| 3,261,378 | 7/1966 | Ayer et al. | 141/12 |
| 3,517,431 | 6/1970 | Ayer | 29/420.5 |

*Primary Examiner*—Houston S. Bell, Jr.
*Attorney*—Roland A. Anderson

[57] ABSTRACT

Elongated multi-region LMFBR fuel elements are prepared by preplacing into a container a coarse fraction of material which includes all of the plutonium and a portion of the uranium in the appropriate regions of the fuel element and then infiltrating with vibration simultaneously a fine-sized fraction of depleted uranium-containing microspheres throughout all interstices in the coarse material in a single loading.

5 Claims, No Drawings

METHOD OF VIBRATORY LOADING NUCLEAR FUEL ELEMENTS

BACKGROUND OF THE INVENTION

The invention described herein was made in the course of, or under, a contract with the United States Atomic Energy Commission. It relates generally to methods for preparing nuclear fuel elements and more specifically to a method of preparing nuclear fuel elements for a Liquid Metal Fast Breeder Reactor (LMFBR).

Considerable research and development is presently being expended toward the successful demonstration of the LMFBR. Because of their relatively advanced technology, mixed oxides such as $(U,Pu)O_2$ are prime candidates for the first cores of demonstration LMFBR reactors. Other fuel element materials, such as carbides, nitrides or hypostoichiometric oxides of any of the fissionable elements and corresponding blanket materials, are also of interest. One of the fuel element designs for the LMFBR is a long, small diameter stainless steel tube filled by vibratory compaction with appropriate microspheres. The use of vibratory compaction in loading elongated fuel elements is well known in the art. In one method disclosed in U.S. Pat. No. 3,261,378 issued on July 19, 1966, in the names of James E. Ayer et al. for "Method and Apparatus For Vibratory Compaction" tubular elements are packed with masses of different diameter spheres by loading the larger diameter spheres while vibrating the tubular element, introducing smaller spheres while holding the larger spheres in place by pressure and thereafter subjecting the loaded tube to combined axial and radial vibration until a uniform close-packed configuration is obtained. This general technique has been followed and modified in various ways. In one method, commonly referred to as the "Sphere-Pac Process," an elongated fuel element which contains both fuel and blanket material in separate zones is prepared using different sized microspheres. This type multi-zone fuel element is utilized in breeder reactors and generally comprises upper and lower blanket regions of fertile material, such as uranium-238 or thorium-232, and a central core region of fissile material, such as a mixture of uranium-238 and plutonium-239 dioxides. The lower blanket region is loaded first with large-sized $UO_2$ microspheres and then small-sized $UO_2$ microspheres are infiltrated, using vibration, around the large-sized microspheres. The core region is next loaded respectively with large- and small-sized microspheres of $(U,Pu)O_2$ using separate steps. Finally, the upper blanket region is loaded, first with large-sized $UO_2$ microspheres and then infiltrated with small-sized $UO_2$ microspheres. An empty plenum region is left above the microspheres for accumulation of any gases. In this manner, and because of the three distinct regions of the fuel element, the fabrication operation by vibratory compaction involved six distinct loading steps. Even with extreme care it was difficult to achieve a sharp distinction between the composition of the respective regions, with the plutonium-containing small-sized microspheres from the core region often entering the lower blanket region and the $UO_2$ small-sized microspheres from the upper blanket region entering similarly the core region.

Another method for preparing fuel elements for breeder reactors is disclosed in U. S. Pat. No. 3,517,431 issued on June 30, 1970, in the name of James E. Ayer for "Method of Making Combination Fuel Rods." In this method, a preselected amount of large diameter blanket material is loaded into the lower blanket region and vibratorily compacted. Then a preselected amount of large diameter fuel material of the same size is loaded into the core region and vibratorily compacted. Thereafter a preselected amount of large diameter blanket material of similar size is loaded into the upper blanket. Next a predetermined amount of a smaller diameter of the same material as that loaded into the lower blanket region is introduced and vibratorily compacted. Once this smaller diameter material is in place in the lower blanket region, smaller diameter fuel material and blanket material are introduced separately and vibratorily compacted into the fuel and upper blanket regions, respectively. This method requires, as does the Sphere-Pac Process, six separate loadings and does not achieve the sharp distinction between the composition of the respective regions. In point of fact, it is not as suitable as the Sphere-Pac Process in providing distinct blanket and core regions. This is seen by the fact that in the Sphere-Pac Process if any given region is under- or over-filled, adjustment can be made prior to proceeding to load the next region. In the Ayer method, the entire length of the fuel element is loaded with large diameter blanket and core materials and successive loadings of smaller diameter material for the corresponding blanket and core regions are made. If any given region is under- or over-filled then the only way to correct such a situation is to remove all of the loaded material from the tubular container and repeat the sequence of steps.

Due to the number of loadings and infiltrations required, the aforementioned processes suffer economic penalties in fabricational costs. Moreover, there is a contamination problem due, particularly, to the fine-sized microspheres containing plutonia. The small-sized material is very dusty and thus, during any handling of the material, some plutonia may be lost and the surrounding areas, including the closure weld of the fuel element container, may become contaminated. It is therefore an object of this invention to provide a more economic process which, in addition, obviates the previously encountered contamination problem for preparing elongated fuel elements via vibratory compaction.

SUMMARY OF THE INVENTION

In accordance with this invention, elongated fuel elements which contain separate blanket and fuel regions are prepared by loading all coarse material which contains all of the plutonium and a portion of the uranium in appropriate regions of the fuel element, and infiltrating, with vibration, fine-sized material consisting of depleted uranium simultaneously throughout all of the regions. In one embodiment the coarse material making up the blanket regions consists of 400–600 microns $^{238}UO_2$ microspheres and the coarse material making up the core region consists of 400–600 microns $^{238}U$, $^{239}Pu$ $(U,Pu)O_2$ microspheres where the U:Pu weight ratio is 4:1. The fine-sized material, which is simultaneously infiltrated throughout the coarse microspheres over the entire length of the fuel element in a single loading, consists of $^{238}UO_2$ microspheres having a diameter no greater than 44 microns. In another embodiment of the invention the coarse material making up the blanket regions consists of $^{238}UO_2$ pellets which are adapted to fit loosely within the tubular container and the coarse material making up the fuel region consists of 400–600 microns ($^{238}U,^{239}Pu)O_2$ microspheres. The fine-sized material consists of $^{238}UO_2$ microspheres having a diameter no greater than 44 microns which is simultaneously infiltrated in a single loading throughout the core region and in the annulus between the container wall and the loose-fitting pellets in the blanket regions.

Unlike the previous vibratory compaction methods, a sharp cutoff (e.g., within 0.03 in.) between the separate blanket and fuel regions is readily achieved. Inasmuch as the fine-sized material comprises only depleted uranium, this part of the fabrication operation can be carried out using only a contact facility (as opposed to hot cell facilities previously required for handling the fine-sized plutonium-containing microspheres).

In comparison with the prior art vibratory compaction methods, the present "U-Fine Process" offers distinct economic advantages for the fabrication of LMFBR fuel elements, providing cost savings of from 6 to 8 percent of the total fuel fabrication cost.

DESCRIPTION OF THE PREFERRED EMBODIMENT

The present invention is broadly applicable to preparing elongated fuel elements containing blanket and core materials by vibratory compaction, utilizing any of the well known compounds of fissionable elements, such as oxides, carbides, nitrides, etc., and corresponding blanket materials. To facilitate an understanding of the invention, the method will be described hereinafter with particular reference to the preparation of a three-region stainless steel clad LMFBR tubular element by the U-Fine Process. The three regions consist of two $^{238}U$-containing blanket (end) regions and a central core region containing nominally 80 wt. % $^{238}U$ and 20 wt. % $^{239}Pu$.

In one embodiment the fuel element is prepared using various sized microspheres. The loading operation is commenced by preplacing coarse $^{238}UO_2$ microspheres 400-600 microns) in the lower blanket region of the stainless steel tubular container. While the $UO_2$ coarse microspheres may be loaded with vibration (e.g., about 30 seconds), the lower blanket region may be loaded with this coarse fraction by carefully pouring the $UO_2$ microspheres into the tubular container. The exact location of the interface between the lower blanket region and the core region may be established by measuring from the top of the fuel element a precalculated distance or by loading a precalculated amount of microspheres into the tubular container. After the coarse fraction for the lower blanket region is placed, coarse $(U,Pu)O_2$ microspheres (400–600 microns) are loaded into the tubular container above the coarse $UO_2$ microspheres making up the lower blanket region. This loading may be carried out with short duration vibrations (about 30 seconds) or by pouring the coarse microspheres slowly into the container. The top interface of this core region is established in the same manner as that of the lower blanket region. Finally, a coarse fraction of $UO_2$ microspheres (400–600 microns) are loaded into the tubular container in stacked relationship to the coarse $(U,Pu)O_2$ core microspheres. This loading, also, may be carried out with short duration vibrations (about 30 seconds) or by pouring the coarse microspheres slowly into the container. The depth of this blanket region is established by the means described above.

Upon completion of loading all of the coarse microspheres, a screen retainer funnel is lowered onto the top of the coarse microspheres in the upper blanket region and held in place by a suitable device such as a fastener. By this arrangement loading of the fine-sized $UO_2$ microspheres is facilitated and the coarse microspheres are maintained in their relative position during subsequent vibratory loading of the fine-sized fraction. The loading of the fine-sized $UO_2$ microspheres should be carried out under an atmosphere which has a minimum moisture content, such as about <2000 ppm. As would be expected with any high surface area solid particles, moisture sorption is a problem which affects the reproducibility of loading the fine-sized fraction.

Infiltration of the fine-sized $UO_2$ microspheres simultaneously through the entire length of the fuel element may be effected using any conventional vibratory apparatus such as that used in the process described in U. S. Pat. No. 3,261,378. See also "Sol-Gel Urania-Plutonia Microsphere Preparation and Fabrication Into Fuel Rods," International Symposium Plutonium Fuels Technology, Scottsdale, Arizona, 1967, Nucl. Met., Vol. 13, pp. 195–210, American Institute of Mining, Metallurgical and Petroleum Engineers, New York, 1968, and J. D. Sease et al. "Sphere-Pac and Pelletization of $(U,Pu)O_2$" Symposium on Sol-Gel Processes and Reactor Fuel Cycles, May 4–7, 1970, Gatlinburg, Tennessee, AEC Conf. 700502, May 1970. The parameters of the vibratory compaction process may vary widely with regard to angle, mode and amplitude of vibration. A suitable amplitude of vibration can be obtained by using a 60 hz vibratory feeder which is mounted at 45° to the normal feeding position. The fuel pin to be vibrated is then clamped to this feeder in a vertical position.

Advantageously, the depleted $UO_2$ fine-sized microspheres, which constitute about 25 percent of the core section, can be prepared in a contact handling facility, thus reducing the total material that must be processed in a remote handling facility by this amount; and the contamination problem of handling fine-sized depleted $UO_2$ microspheres is orders of magnitude less than with handling fine-sized plutonium-containing microspheres.

The time of infiltration of the fine-sized fraction may also vary over a wide range, depending upon condition of the fine microspheres and packing quality of the coarse bed. Typically for loading 0.250 inch diameter fuel beds greater than 16 inches long, the infiltration time is approximately 1 ½ inches per minute. A suitable time for infiltrating the fine-sized $UO_2$ through a 48-inch long coarse fraction bed is 30 minutes.

In another embodiment $UO_2$ pellets, which are adapted to fit loosely into the tubular container, are substituted as the coarse fraction for the coarse $UO_2$ microspheres. In this embodiment UO₂ loose fitting pellets which are 200–400 microns in diameter smaller than the inside diameter of the clad tubing are loaded into the container to form the lower blanket region, coarse $(U,Pu)O_2$ microspheres (400–600 microns) are next loaded to form the core region and corresponding loose fitting $UO_2$ pellets are loaded on top of the $(U,Pu)O_2$ microspheres to form the upper blanket region. The pellets should be of a size to provide an annulus between the pellets and the tubular container of a sufficient size to permit the fine-sized $UO_2$ microspheres to easily pass through. Where the $UO_2$ microspheres have a diameter no greater than 44 microns the clearance between the loaded pellets and the wall of the container should be 200–400 microns.

Upon loading the $UO_2$ pellets into the upper blanket region, a weighted rod is lowered on top of the $UO_2$ pellets and the fine-sized $UO_2$ microspheres infiltrated simultaneously throughout the three-region fuel element by passing the $UO_2$ microspheres through the annulus between the pellets and the container wall. In this manner the fine-sized $UO_2$ microspheres infiltrate around the loose-fitting pellets and center the pellets providing for smear densities of greater than 90 percent of theoretical. Thus, it may be seen that even where $UO_2$ pellets are substituted for coarse $UO_2$ microspheres, the entire fuel element (blanket regions and core regions) is vibratorily infiltrated with fine-sized $UO_2$ microspheres in a single loading. Advantageously, this embodiment permits lower tolerances than previously required with pelletized fuels and even permits the use of cracked or chipped pellets, since the fine-sized $UO_2$ microspheres infiltrate around the pellets in the annulus between the pellets and the wall of the container to fill any voids created by cracks or chips and provide increased physical stability. This embodiment also tends to reduce the pellet-cladding interaction.

The subject "U-Fine Process" has a distinct advantage for the fabrication of LMFBR fuel elements. When compared with the use of (1) mechanically blended pellets, (2) co-precipitated pellets, and (3) sol-gel pellets, a cost savings with the present method of 6 to 8 percent of the total fuel fabrication cost of a conversion-fabrication plant is realized. This is shown in the following table.

TABLE

Estimated Fuel Element Costs

Cost For Various Plants (#/Kg Heavy Metal)

| Item | Mechanical Blend Pellets | Co-precipitation Pellets | Sol-Gel Pellets | U-Fine Sol-Gel Sphere-Pac |
|---|---|---|---|---|
| Capital | 11.23 | 12.91 | 11.74 | 9.51 |
| Operating | 31.58 | 35.37 | 32.27 | 24.68 |
| Loss | 19.47 | 17.77 | 17.77 | 10.20 |
| Scrap | 8.20 | 6.52 | 5.93 | 2.60 |
| Total Cost | 70.48 | 72.57 | 67.71 | 46.99 |
| Differential | 23.49 | 25.58 | 20.72 | — |

Having described the invention in a general fashion the following examples are given by way of illustration to further describe in greater detail the U-Fine Process.

EXAMPLE I

A .250 inch O.D. × .230 inch I.D. × 5 foot long stainless steel tube was loaded with binary mixtures of microspheres to simulate a typical oxide fueled Fast Breeder Reactor fuel pin. In this fuel pin we loaded two 12 inch long bottom and top blanket sections and a 24 inch long fueled core section. The coarse microspheres for each section of the fuel pin were 400–600 microns in diameter. The coarse fraction in the blanket regions was depleted $UO_2$ microspheres. In the core section the coarse fraction was $ThO_2$ microspheres to simulate the $(U,Pu)O_2$ fuel for FBR's.

In loading the fuel pin, first 50.4 grams of the coarse $UO_2$ microspheres were weighed out and poured into the fuel pin with the aid of a funnel to form the 12 inch length of the bottom blanket section. Next 91.8 grams of coarse $ThO_2$ microspheres were weighed out and poured in on top of the bottom blanket microspheres to form the 24 inch long core section. The top blanket section was made by weighing out another 50.4 grams of the coarse $UO_2$ microspheres and pouring in the fuel pin on top of the core section. During loading the coarse fractions the fuel pin was clamped in a 60 hz vibratory compaction apparatus similar to that described by Ayer's 1966 U.S. Pat. No. 3,261,378. Vibration was applied during the loading of the coarse fractions which took approximately 1 minute each to load the blanket sections and 2 minutes for the core section.

After loading the coarse fraction, a screen funnel was placed on top of the microsphere column. The screen used to retain the coarse fractions had an opening of 250 microns. The loading of the fine fraction was accomplished by loading 74.6 grams of $UO_2$ microspheres into the screen funnel. Vibration was then applied for 30 minutes to infiltrate the 48 inch long coarse bed with the fine $UO_2$ microspheres.

EXAMPLE II

A fuel pin of the same description as in Example I was loaded. In this example, the only difference in the loading was that pellets were used in place of the coarse microspheres for the bottom and top blanket sections. The pellets used for the bottom and top blanket sections were depleted $UO_2$ and were solid right circular cylinders with a nominal O.D. of .208 inch × .250 inch height. The pellets had a density of 95 percent of theoretical.

The loading of the fuel pin was accomplished by first sliding 12 inches of $UO_2$ pellets into the fuel pin. Next, 91.8 grams of coarse $ThO_2$ microspheres were poured in on top of the blanket pellets to form the core section. Another 12 inches section of $UO_2$ pellets were the placed on top of the core coarse microspheres. A 200-gram 1/8 inch diameter weighed rod was then placed on top of the top blanket pellet and 47.92 grams of $UO_2$ fine introduced. Vibration was then applied for 15 minutes to infiltrate the fines into the voids.

What is claimed is:

1. A method for preparing elongated fuel elements having separate blanket and core regions comprising the steps of loading a container with a coarse material selected from uranium- and plutonium-containing compounds in appropriate regions of said fuel element, and thereafter infiltrating, with vibration, fine-sized material consisting of a depleted uranium compound simultaneously throughout said coarse material.

2. The method of claim 1 wherein said fuel element comprises a three-region stainless steel clad tubular element, said coarse material comprises $UO_2$ and $(U,Pu)O_2$ microspheres having a diameter of between 400–600 microns and said fine-sized material comprises depleted $UO_2$ microspheres having a diameter no greater than 44 microns.

3. The method of claim 2 wherein a portion of said coarse $UO_2$ microspheres is loaded into a lower blanket region, said coarse $(U,Pu)O_2$ microspheres are loaded into a central core region, the remainder of said coarse $UO_2$ microspheres are loaded into an upper blanket region and said fine-sized depleted $UO_2$ microspheres are infiltrated simultaneously with vibration throughout said coarse microspheres.

4. The method of claim 1 wherein said fuel element comprises a three-region stainless steel tubular element, said coarse material comprises $UO_2$ pellets adapted to fit loosely within said element and $(U,Pu)O_2$ microspheres having a diameter of between 400–600 microns and said fine-sized material comprises depleted $UO_2$ microspheres having a diameter no greater than 44 microns.

5. The method of claim 4 wherein a portion of said coarse $UO_2$ pellets are loaded into a lower blanket region, said coarse $(U,Pu)O_2$ microspheres are loaded into a central core region, the remainder of said coarse $UO_2$ pellets are loaded into an upper blanket region and said fine-sized depleted $UO_2$ microspheres are infiltrated simultaneously with vibration throughout said coarse microspheres and around said $UO_2$ pellets.

* * * * *